United States Patent [19]

Zur

[11] Patent Number: 5,157,423

[45] Date of Patent: Oct. 20, 1992

[54] APPARATUS FOR PATTERN GENERATION ON A DIELECTRIC SUBSTRATE

[75] Inventor: Albert Zur, Givat Savion, Israel

[73] Assignee: Cubital Ltd., Herzlia, Israel

[21] Appl. No.: 697,166

[22] Filed: May 8, 1991

[51] Int. Cl.⁵ .......................................... G01D 15/06
[52] U.S. Cl. .................................... 346/159; 346/1.1; 346/153.1; 346/154
[58] Field of Search ............ 346/159, 155, 154, 153.1, 346/1.1

[56] References Cited

U.S. PATENT DOCUMENTS

| | | | |
|---|---|---|---|
| 3,055,006 | 1/1961 | Dreyfoos. Jr. et al. ............ | 346/151 |
| 4,087,826 | 5/1978 | Haeberle ............................ | 346/155 |
| 4,448,867 | 5/1984 | Ohkubo et al. ................. | 346/153.1 X |
| 4,463,363 | 7/1984 | Gundlach et al. .................. | 346/159 |
| 4,636,815 | 1/1987 | Yuusa ............................... | 346/153.1 |
| 4,748,464 | 5/1988 | Pannekoek et al. ................ | 346/155 |

OTHER PUBLICATIONS

R. M. Schaffert, "Electrophotography", 2nd Ed., Focal Press, London, 1975, pp. 166–176.

Primary Examiner—Bejnamin R. Fuller
Assistant Examiner—Randy Gibson
Attorney, Agent, or Firm—Townsend and Townsend

[57] ABSTRACT

Apparatus for pattern generation on a dielectric substrate having first and second surfaces and including:
  apparatus for applying a voltage to a first surface of the dielectric substrate; and
  apparatus for applying a flow of charges to the second surface of the dielectric substate, whereby following application of such charges, the second surface retains a charge corresponding to the voltage applied to the first surfaces.

21 Claims, 6 Drawing Sheets

FIG.7C

APPARATUS FOR PATTERN GENERATION ON A DIELECTRIC SUBSTRATE

FIELD OF THE INVENTION

The present invention relates to charge pattern generation on dielectric substrates generally and more particularly to apparatus and methods for non-contact patterning and imaging.

BACKGROUND OF THE INVENTION

There exist in the patent literature disclosures of a great number of techniques for non-contact printing and imaging. The most widely used of these techniques is electrophotography wherein an electrostatic image is optically formed on a photoconductor, which is then developed with a toner. The toner image is transferred to a substrate and fused thereon.

An additional technique in general use is ionography, wherein an electrostatic image is formed on a dielectric substrate by firing charges directly on the substrate using an imagewise ion source.

A technique for the transfer of electrostatic images from a photoconductor dielectric onto a dielectric substrate has also been proposed in *Electrophotography* by R. M. Schaffert, 2nd Edition, Focal Press, London, 1975 at pages 166-176 and in U.S. Pat. No. 3,055,006. This technique, known as TESI (Transfer of Electrostatic Images) employs an imagewise optical signal to create a charge image on a photoconductor. The charge image is subsequently replicated onto a dielectric substrate by applying single polarity charges to a surface of the dielectric substrate opposite from that surface which faces the photoconductor.

SUMMARY OF THE INVENTION

The present invention seeks to provide a novel system and method for pattern generation on a substrate.

There is thus provided in accordance with a preferred embodiment of the present invention apparatus for pattern generation on a dielectric substrate having first and second surfaces and including:

apparatus for applying a voltage to a first surface of the dielectric substrate; and apparatus for applying a flow of charges to the second surface of the dielectric substrate, whereby following application of such charges, the second surface retains a charge corresponding to the voltage applied to the first surface.

Additionally in accordance with a preferred embodiment of the present invention there is provided apparatus for direct charge patterning of a dielectric substrate having first and second surfaces and comprising:

apparatus for imagewise application of voltage to a first surface of the dielectric substrate; and apparatus for applying a flow of charges to the second surface of the dielectric substrate, whereby following application of such charges there appears on the second surface an imagewise charge distribution corresponding to the voltage applied imagewise to the first surface.

Additionally in accordance with a preferred embodiment of the present invention there is provided a method for pattern generation on a dielectric substrate having first and second surfaces and including the steps of:

applying a voltage directly to a first surface of the dielectric substrate; and applying a flow of charges to the second surface of the dielectric substrate, whereby following application of such charges, the second surface retains a charge corresponding to the voltage applied to the first surface.

Additionally in accordance with a preferred embodiment of the present invention there is provided a method for patterning a dielectric substrate having first and second surfaces and comprising the steps of:

imagewise application of voltage to the first surface of the dielectric substrate; and applying a flow of charges to the second surface of the dielectric substrate to temporarily neutralize the effect on the second surface of the voltage applied to the first surface, whereby following application of such charges there appears on the second surface an imagewise charge distribution corresponding to the voltage applied imagewise to the first surface.

In accordance with a preferred embodiment of the present invention, the flow of charges which is applied to the second surface of the dielectric substrate contains charges of both positive and negative polarities. Preferably, the flow of charges alternates in time between positive and negative charges.

Additionally in accordance with a preferred embodiment of the present invention, as the result of the flow of charges, the second surface retains a generally uniform charge corresponding to the voltage applied to the first surface.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1A:
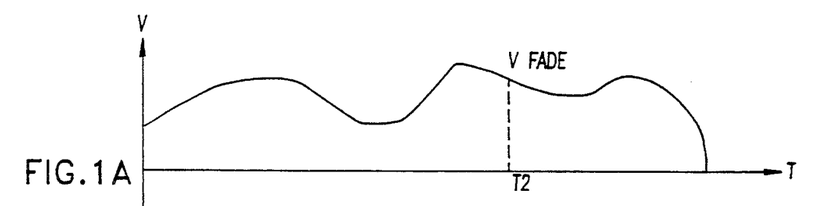
FIGS. 1A, 1B, 1C and 1D are illustrations of the application of voltage or charge on various surfaces over time in accordance with a preferred embodiment of the present invention.

Reference is now made to FIGS. 1A-1D, which illustrate the operation of the present invention. FIG. 1A illustrates an arbitrary voltage at a typical point location on a first surface of a dielectric substrate as it varies over time. The voltage may be applied to the typical point location by means of a conductive backing associated with the first surface of the dielectric substrate in touching or capacitive relationship therewith. The conductive backing may be a separate conductor in close proximity to, or alternatively a permanent coating or layer formed on, the first surface of the dielectric substrate.

Figure 1B:
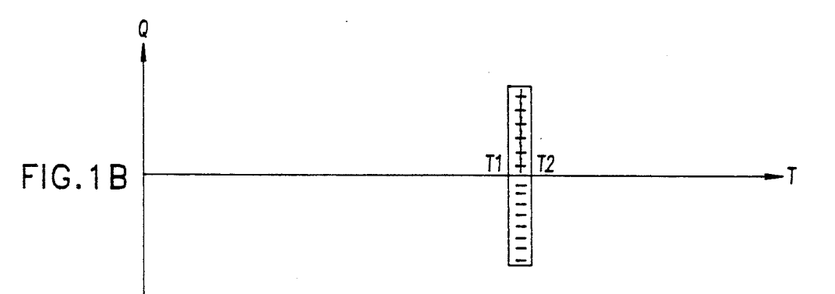

FIG. 1B illustrates, on the same time scale as in FIG. 1A, the application of a flow of charges to the second surface of the dielectric substrate to temporarily neutralize the effect on the second surface of the voltage applied to the first surface, whereby following application of such charges the second surface retains a charge corresponding to the voltage which was applied to the first surface, at the time T2 that the application of such charges ceased, but of an opposite polarity thereto.

According to a preferred embodiment of the invention, the flow of charges comprises an alternating polarity charge flow to a second surface of the dielectric substrate which is opposite to and generally uniformly spaced from the first surface. This alternating polarity charge flow takes place over a time span, which is short relative to the time variation of the voltage applied to the first surface, such that during this time span the voltage does not change considerably, and is represented in FIG. 1B by a stack of positive and negative charges. The beginning and end of the duration of the application of the alternating polarity charge flow are indicated in FIG. 1B respectively as T1 and T2.

Figure 1C:
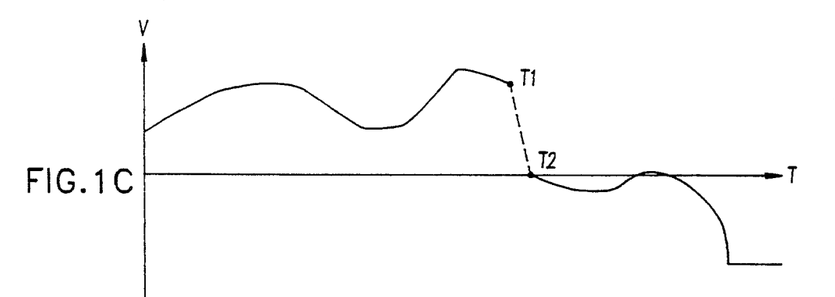

FIG. 1C illustrates the voltage on the second surface of the dielectric substrate. It is noted that this voltage tracks the voltage on the first surface until the charge flow begins at time T1. Upon termination of the charge flow at time T2, the voltage of the second surface is very nearly zero. Thereafter if the voltage on the first surface becomes zero, the voltage on the second surface becomes approximately the negative of the voltage on the first surface at time T2, due to charge accumulation on the second surface.

Figure 1D:
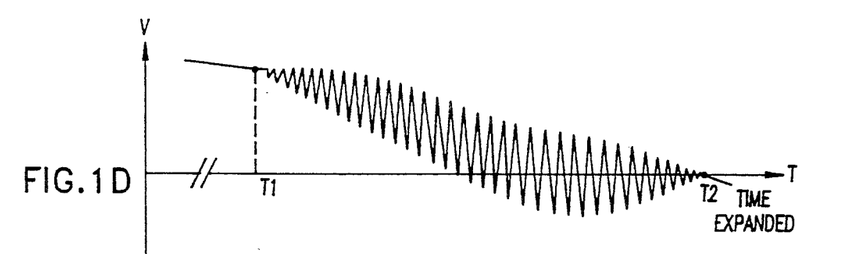

FIG. 1D is an expanded time scale illustration corresponding to FIG. 1C and illustrating with greater particularity one possible application of an alternating charge flow to the second surface, which results in a reduction in the voltage on the second surface from the voltage at T1 to very nearly zero at T2.

Figure 2:
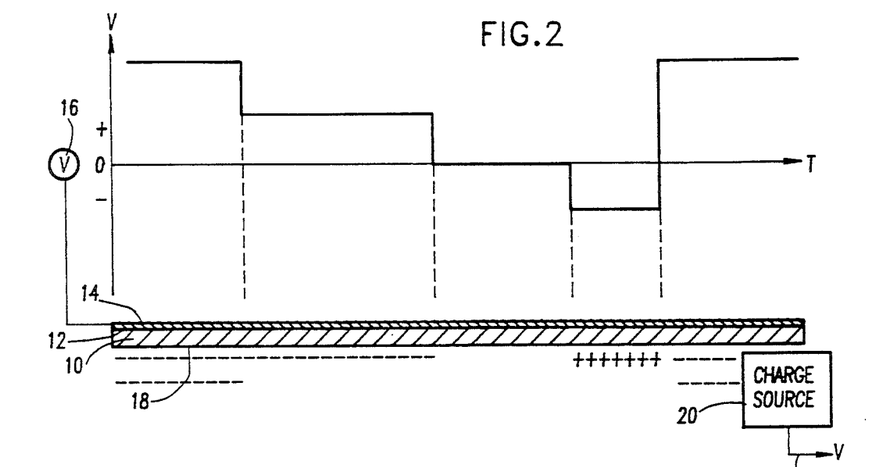
FIG. 2 is an illustration of a time varying voltage pattern on a first surface of a dielectric substrate resulting in a corresponding charge pattern on an opposite surface of the dielectric substrate in accordance with a preferred embodiment of the present invention.

Referring now to FIG. 2, there is shown schematically an arbitrary voltage pattern provided on a dielectric substrate 10 at a first surface 12 thereof, which is preferably backed with a conductive backing 14 to which is coupled a time-variable voltage source 16. FIG. 2 also illustrates in one dimension, the corresponding spatial charge pattern, of opposite polarity to the corresponding voltage pattern, which is produced on a second surface 18 of the dielectric substrate in accordance with the present invention, by application of a flow of alternating polarity charges to the second surface which is operative to temporarily neutralize the effect on the second surface of the voltage applied to the first surface 12. The application of the flow of charges is preferably provided by an alternating polarity charge source 20, such as an AC corona, capable of achieving a spatial edge accuracy consistent with the desired resolution. Such an AC corona may be realized by employing one or more corona needles enclosed within a shield having a defined charge outlet opening and by amplitude modulation of the AC voltage supplied to the corona wire or wires.

The charge source 20 is preferably moved at a velocity v along the second surface 18 of the dielectric substrate 10, indicated by an arrow 22.

Figure 3:
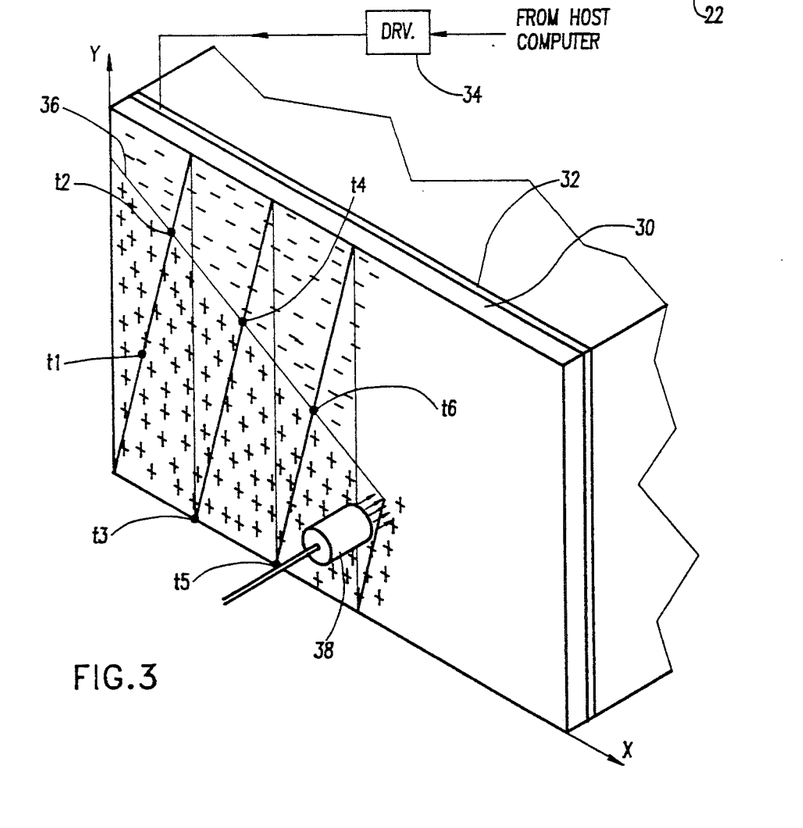
FIG. 3 is a pictorial illustration of apparatus for applying voltage and charges to opposite surfaces of a dielectric substrate in accordance with one embodiment of the present invention.

Reference is now made to FIG. 3 which is a pictorial illustration of apparatus for applying voltage and charges to opposite surfaces of a dielectric substrate 30 in accordance with one embodiment of the present invention. In this embodiment, a conductive plate 32 may be disposed adjacent a first surface of the dielectric substrate 30 and may receive a time-varying voltage from a voltage driver 34, which may be controlled by a host computer.

In the illustrated embodiment, it is desired to produce on a second surface a charge pattern which is uniformly negative above a diagonal line 36 and is uniformly positive below the diagonal line. It is appreciated that any suitable charge pattern may be produced using the apparatus and technique illustrated in FIG. 3 and described herein.

A charge source 38, such as that described above, which produces charges which vary in polarity as a function of time, scans the second surface of the dielectric substrate 30 along an arbitrary pattern, such as the up/down and sideways pattern illustrated in FIG. 3.

As described above, in accordance with a preferred embodiment of the invention, as the charge source 38 moves out of charge supply engagement with a given location on the second surface of the substrate 30, at a given time, the residual charge at such location corresponds to the negative of the voltage on the first surface at such time. Thus, it may be appreciated, the modulation of the voltage on conductive plate 32, coordinated with the two dimensional position of the charge source 38 on the second surface enables charge writing on the second surface by information content modulation of the voltage applied to the first surface.

Figure 7A:
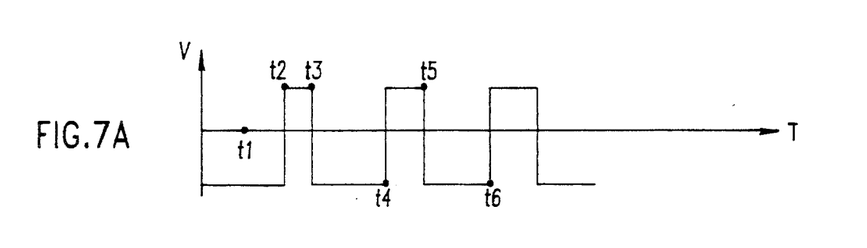
FIGS. 7A, 7B and 7C are diagrams of various operational parameters of the apparatus of FIG. 3.
Figure 7B:
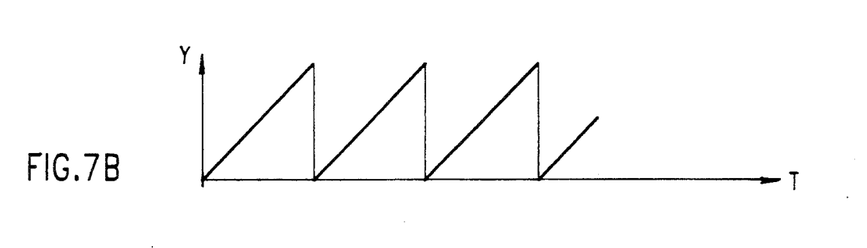
Figure 7C:
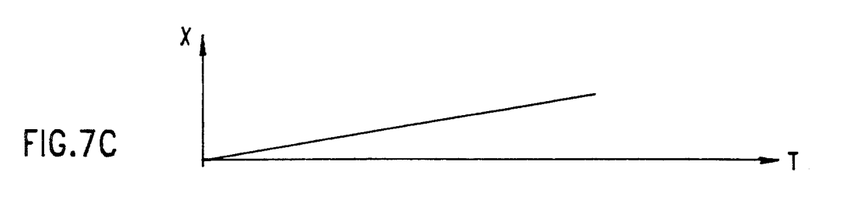

The operation of the apparatus of FIG. 3 may be appreciated and understood better by means of reference to FIGS. 7A-7C. FIGS. 7A-7C, which all lie along the same time scale, illustrate operational parameters of the operation of the apparatus of FIG. 3. FIG. 7A, illustrates the voltage applied to the conductive backing layer 32 and thus to the first surface of the dielectric substrate as a function of time. The indications t1-t6 illustrate the position to the charge source 38 at various times.

FIGS. 7B and 7C illustrate the Y and X positions of the charge source 38 as a function of time.

Figure 4A:
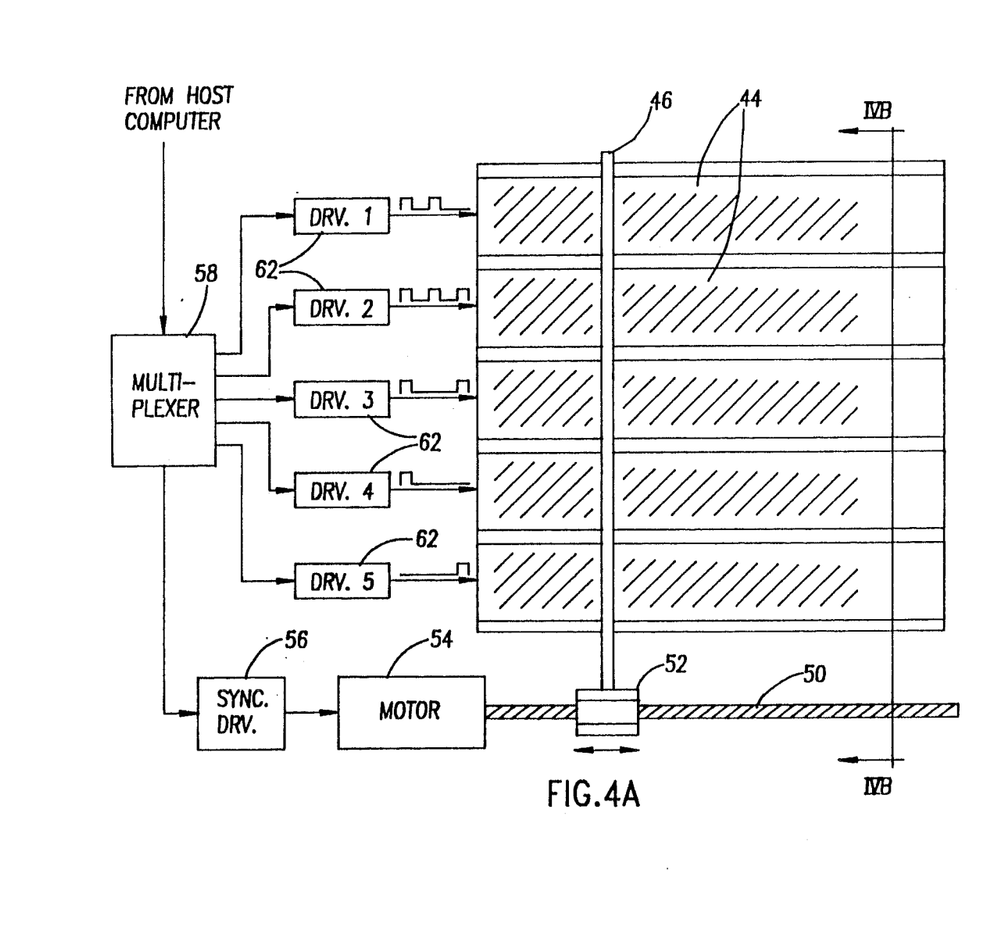
FIGS. 4A and 4B are respective generalized and side view illustrations of apparatus for applying voltage and charges to opposite surfaces of a dielectric substrate in accordance with another embodiment of the present invention.
Figure 4B:
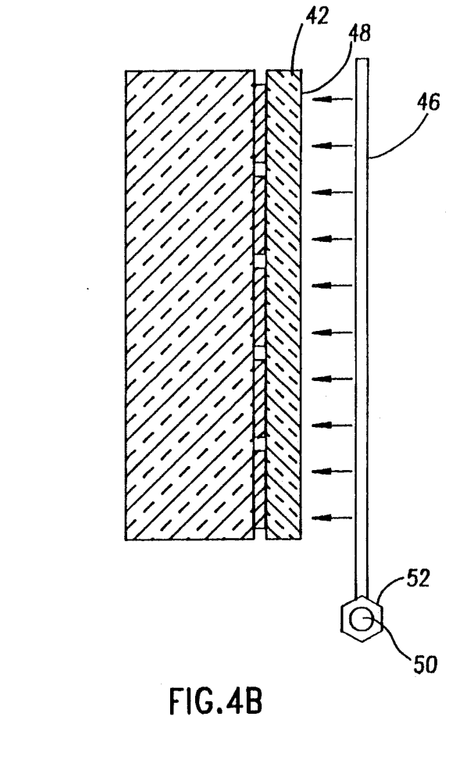

Reference is now made to FIGS. 4A and 4B which illustrate apparatus for applying voltage and charges to opposite surfaces of a dielectric substrate 42 in accordance with another embodiment of the present invention.

In this embodiment, an elongate alternating polarity charge source 46, such as that described above but employing elongate wires instead of needles, is scanned in one dimension, perpendicular to its longitudinal axis, along the second surface 48 of substrate 42, by means of a linear drive mechanism including a worm screw 50 cooperating with a screw rider 52, fixed to source 46. An electric motor 54 drives the worm screw 50 in response to the outputs of a commercially available synchronized driver 56. A host computer (not shown) provides positioning instructions via a multiplexer 58 to driver 56.

In this embodiment, a multisectional conductive backing layer 60, typically comprising a plurality of elongate strips 44, is associated with the first surface of the dielectric substrate 42. Each strip 44 is provided with an information content modulated time varying voltage via a corresponding driver 62, in response to control signals received from the host computer via multiplexer 58.

It may be appreciated that in the embodiment of FIGS. 4A and 4B a charge pattern is written on the second surface by information content modulation of voltages applied simultaneously to the different regions of the first surface of the dielectric substrate 42 via strips 44 in synchronism with the one dimensional scanning motion of source 46.

It will be appreciated that in principle due to the parallel voltage "writing", the apparatus of FIGS. 4A and 4B has an intrinsically greater writing speed than the apparatus of FIG. 3.

Figure 5A:
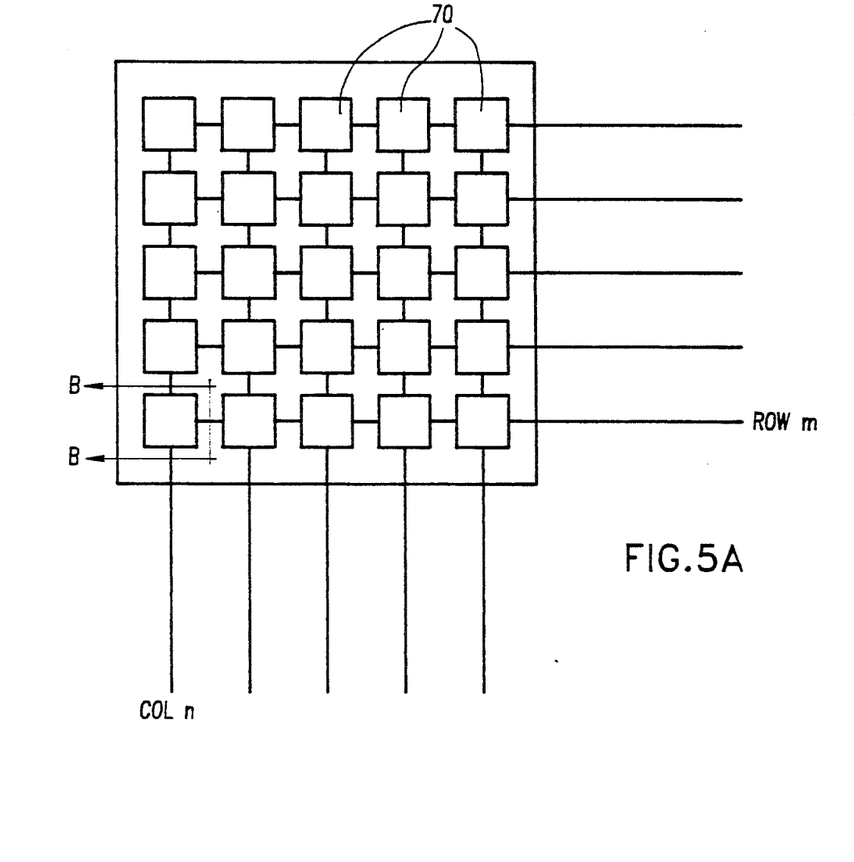
FIGS. 5A and 5B are respective generalized and detail illustrations of apparatus for applying voltage and charges to opposite surfaces of a dielectric substrate in accordance with yet another embodiment of the present invention.
Figure 5B:
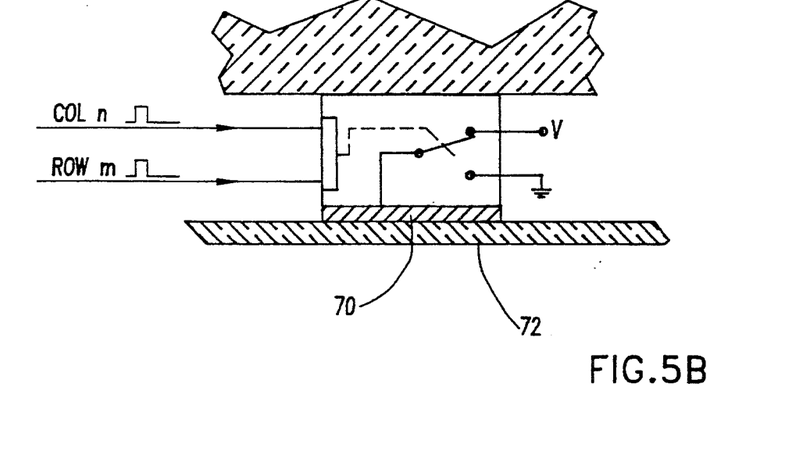

Reference is now made to FIGS. 5A and 5B which are respective generalized and detail illustrations of apparatus for applying voltage and charges to opposite surfaces of a dielectric substrate in accordance with yet another embodiment of the present invention. Here strips 44 in the embodiment of FIGS. 4A and 4B are replaced by a two dimensional array of pixel sized conductive pads 70 which define a two-dimensionally addressable conductive backing array disposed adjacent the first surface of a dielectric substrate 72. In this case, the alternating polarity charge source need not scan the first surface but instead may uniformly deposit charges thereover.

It may be appreciated that in the embodiment of FIGS. 5A and 5B a charge pattern is written on the second surface by information content modulation of voltages applied simultaneously to the different regions of the first surface of the dielectric substrate 72 via individual pads 70 without requiring synchronization with the operation of the charge source (not shown).

FIG. 5B illustrates a schematic arrangement for addressing a given pad 70, corresponding to a given area element or pixel on the dielectric surface, with either a given voltage or ground.

Figure 6A:
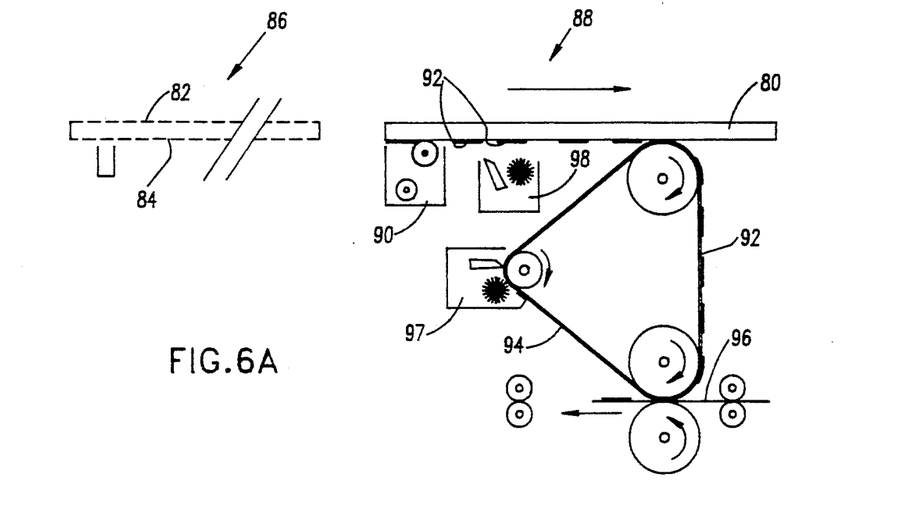
FIGS. 6A and 6B are simplified illustrations of apparatus for printing constructed and operative in accordance with a preferred embodiment of the present invention.
Figure 6B:
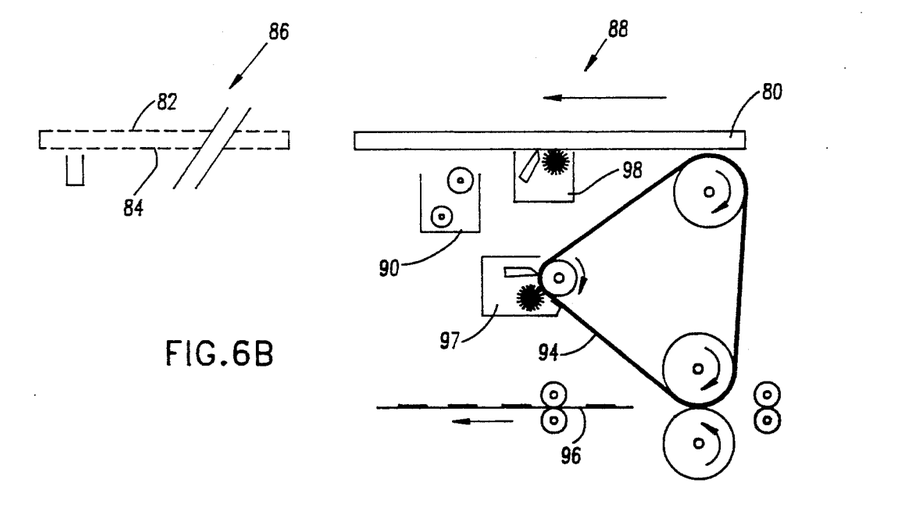

Reference is now made to FIGS. 6A and 6B which illustrate an imaging system constructed and operative in accordance with a preferred embodiment of the present invention and comprising a dielectric substrate 80 having a first surface 82 and a second surface 84. The dielectric substrate 80 may be self-supporting or alternatively supported on a suitable support, such as a plate of glass.

The imaging system includes a charge patterning station 86 and a toner application and printing station 88. In this embodiment, the dielectric substrate 80 is reused and moves repeatedly between the stations 86 and 88. The charge patterning station 86 preferably comprises apparatus of the general type described in connection with the embodiment of FIG. 4, while the toner application and printing station 88 may be any conventional toner application and printing device.

It is appreciated that a printing and imaging system may equally be operative using a charge patterning station according to any embodiment of the invention, including, without limitation, those illustrated in FIGS. 3-5B.

For example, station 88 may comprise conventional toner application apparatus 90 for applying toner to a charged surface of a dielectric, thereby providing a toner image on the second surface, as indicated by reference number 92 and an intermediate transfer member 94 for transferrinq the toner image 92 onto a final substrate 96, such as paper, onto which the toner image is fused by conventional techniques. A cleaning unit 9 cleans the intermediate transfer member 94 following transfer.

FIG. 6A illustrates the stage of toner application and transfer to the final substrate, while FIG. 6B illustrates cleaning of the dielectric substrate 80 by a conventional cleaning unit 98.

The unique feature of the apparatus of FIGS. 6A and 6B lies in the fact that unit 86 comprises apparatus in which a charge source along the second surface of the dielectric substrate 80 temporarily neutralizes the effect on the second surface of the voltage applied to the first surface, whereby following application of such charges, the second surface retains a charge corresponding to the voltage applied to the first surface at the time that the application of charge at each given location was discontinued.

It is appreciated that imaging and printing systems may be provided wherein the intermediate transfer member may be eliminated and thus the dielectric substrate 80 on which the charge image is initially formed is the final substrate to which the toner image is eventually fused. As a further alternative, transfer of the toner image on the dielectric substrate 80 directly to a final substrate may be provided.

It will be appreciated by persons skilled in the art that the present invention is not limited to what has been particularly shown and described hereinabove. Rather the scope of the present invention is defined only by the claims which follow:

I claim:

1. Apparatus for pattern generation on a dielectric substrate having first and second surfaces and including:

means for applying voltage signals to a first surface of the dielectric substrate whereby said voltage signals vary with time and represent a desired pattern;

means for applying a flow of charges generally only to a second surface of the dielectric substrate wherein said charges flow from a generally nonimagewise source and whereby as a result of application of such charges, the second surface retains a non-visible charge pattern corresponding to the desired pattern represented by the voltage signals; and means for thereafter employing the non-visible charge pattern to provide a visible image.

2. Apparatus for charge patterning of a dielectric substrate having first and second surfaces and comprising:

means for imagewise application of voltage to a first surface of the dielectric substrate;

means for applying a flow of charges generally only to a second surface of the dielectric substrate, wherein said charges flow from a generally nonimagewise source and whereby as a results of application of such charges the second surface retains a non-visible charge distribution corresponding to the voltage applied imagewise to the first surface; and means for thereafter employing the charge distribution to provide a visible image.

3. A method for pattern generation on a dielectric substrate having first and second surfaces and including the steps of:
applying voltage signals to a first surface of the dielectric substrate whereby said voltage signals vary with time and represent a desired pattern;
applying a flow of charges generally only to a second surface of the dielectric substrate, wherein said charges flow from a generally non-imagewise source and whereby as a result of application of such charges, the second surface retains a non-visible charge pattern corresponding to the desired pattern represented by the voltage signals; and
employing the non-visible charge pattern to provide a visible image.

4. A method for patterning of a dielectric substrate having first and second surfaces and comprising the steps of:
imagewise application of voltage to a first surface of the dielectric substrate;
applying a flow of charges generally only to a second surface of the dielectric substrate, wherein said charges flow from a generally non-imagewise source an whereby as a result of application of such charges the second surface retains a non-visible charge distribution corresponding to the voltage applied imagewise to the first surface; and
employing the non-visible charge distribution to provide a visible image.

5. Apparatus according to claim 1 and wherein the flow of charges which is applied to the second surface of the dielectric substrate contains charges of both positive and negative polarities.

6. Apparatus according to claim 2 and wherein the flow of charges which is applied to the second surface of the dielectric substrate contains charges of both positive and negative polarities.

7. Apparatus according to claim 5 and wherein the flow of charges alternates in time between positive and negative charges.

8. Apparatus according to claim 6 and wherein the flow of charges alternates in time between positive and negative charges.

9. Apparatus according to claim 1 and wherein as the result of the flow of charges, the second surface retains a generally uniform charge corresponding to the voltage applied to the first surface.

10. A method according to claim 3 and wherein the flow of charges which is applied to the second surface of the dielectric substrate contains charges of both positive and negative polarities.

11. Apparatus according to claim 1 and wherein application of said charges to the second surface is operative to temporarily neutralize the effect on the second surface of the voltage applied to the first surface.

12. Apparatus according to claim 1 and wherein application of said charges to the second surface is operative to establish a charge pattern on the second surface in accordance with the voltage pattern on the first surface.

13. Apparatus for marking a dielectric substrate having first and second surfaces and including:
means for applying voltage signals generally only to a first surface of the dielectric substrate whereby said voltage signals vary with time and represent a desired pattern;
means for applying a flow of charges generally only to a second surface of the dielectric substrate wherein said charges flow from a generally non-imagewise source and whereby as a result of application of such charges, the second surface retains a non-visible charge pattern corresponding to the desired pattern represented by the voltage signals; and
means for applying toner to said charge pattern on said second surface, thereby to define a marking on said dielectric substrate in accordance with said charge pattern.

14. Apparatus for pattern generation on a dielectric substrate having first and second surfaces and including:
means for applying a charge pattern to a first surface of the dielectric substrate; and
means for applying an alternating flow of charges to a second surface of the dielectric substrate, wherein said charges flow from a generally non-imagewise source and whereby as a result of application of such charges the second surface retains a non-visible charge distribution corresponding to the charge pattern applied to the first surface; and
means for thereafter employing the charge distribution to provide a visible image.

15. Apparatus according to claim 1 and wherein the charge pattern on the second surface is of a polarity opposite to the polarity of the voltage pattern on the first surface.

16. Apparatus according to claim 2 and wherein the charge pattern on the second surface is of a polarity opposite to the polarity of the voltage pattern on the first surface.

17. A method according to claim 3 and wherein the charge pattern on the second surface is of a polarity opposite to the polarity of the voltage pattern on the first surface.

18. A method according to claim 4 and wherein the charge pattern on the second surface is of a polarity opposite to the polarity of the voltage pattern on the first surface.

19. Apparatus according to claim 13 and wherein the charge pattern on the second surface is of a polarity opposite to the polarity of the voltage pattern on the first surface.

20. Apparatus according to claim 14 and wherein the charge pattern on the second surface is of a polarity opposite to the polarity of the voltage pattern on the first surface.

21. Apparatus for pattern generation on a dielectric substrate having first and second surfaces and including:
means, including a plurality of conductive strips disposed adjacent said first surface, for applying voltage signals to a first surface of the dielectric substrate whereby said voltage signals vary with time and represent a desired pattern;
corona means for applying a flow of charges generally only to a second surface of the dielectric substrate wherein said charges flow from a generally non-imagewise source and whereby as a result of application of such charges, the second surface retains a non-visible charge pattern corresponding to the desired pattern represented by the voltage signals; and
means for thereafter employing the non-visible charge pattern to provide a visible image.

* * * * *